United States Patent [19]

Mitchell et al.

[11] Patent Number: 4,988,655

[45] Date of Patent: Jan. 29, 1991

[54] POLYOLEFIN POLYMERIZATION CATALYST AND METHOD OF PRODUCTION USE

[75] Inventors: Kent E. Mitchell, Bartlesville; Gil R. Hawley, Dewey; Don W. Godbehere, Ochelata, all of Okla.

[73] Assignee: Phillips Petroleum Company, Bartlesville, Okla.

[21] Appl. No.: 443,690

[22] Filed: Nov. 30, 1989

[51] Int. Cl.$^5$ ............................................. C08F 4/642
[52] U.S. Cl. .................................. 502/108; 502/111; 502/119; 502/127
[58] Field of Search ............... 512/111, 119, 127, 108

[56] References Cited

U.S. PATENT DOCUMENTS

| | | | |
|---|---|---|---|
| 2,893,984 | 7/1959 | Seelbach et al. | 260/93.7 |
| 2,938,890 | 5/1960 | D'Alello | 260/94.9 |
| 4,394,291 | 7/1983 | Hawley | 252/429 B |
| 4,477,588 | 10/1984 | Hawley | 502/119 |
| 4,503,159 | 3/1985 | Masino et al. | 502/119 |

*Primary Examiner*—Patrick P. Garvin
*Assistant Examiner*—E. D. Irzinski
*Attorney, Agent, or Firm*—Edward L. Bowman

[57] ABSTRACT

A catalyst useful in the polymerization of olefinic compounds and particularly 4-methyl-1-pentene is disclosed along with its method of preparation and use. The catalyst is prepared by (a) forming a first component by reacting reactants comprising a magnesium dihalide, a phenol, and alkylbenzoate, and a titanium tetrahydrocarbyloxide; (b) reacting the first component with an organoaluminum halide compound to produce a solid product; and (c) then contacting the resulting solid product with an activating liquid comprising titanium tetrachloride and trichlorosilane in a confined zone under pressure of at least 70 psi.

19 Claims, No Drawings

POLYOLEFIN POLYMERIZATION CATALYST AND METHOD OF PRODUCTION USE

The present invention relates to the polymerization of olefins. In another aspect, this invention relates to novel catalyst useful for the polymerization of olefins.

U.S. Pat. No. 4,394,291, the disclosure of which is incorporated herein by reference, discloses a high activity olefin polymerization catalyst which is also capable of providing good selectivity to isotactic polymer for olefins such as propylene and higher aliphatic 1-olefins. Among the catalysts disclosed in that patent are those which are prepared by reacting reactants comprising a magnesium dihalide, a hydrocarbyl phenol, an alkyl benzoate, and a titanium tetra-alkoxide to form a first component; then reacting that first component with an organoaluminum halide to produce a solid product; and then contacting the resulting solid product with an activating liquid comprising $TiCl_4$. One of the more preferred catalysts disclosed in that patent was prepared using an activating liquid comprising a mixture of titanium tetrachloride and trichlorosilane. U.S. Pat. No. 4,477,588, the disclosure of which is incorporated herein by reference, discloses that improved stereospecificity in the polymer can be obtained if the activating liquid comprises a silicon tetrachloride in addition to titanium tetrachloride and trichlorosilane.

When such catalysts were prepared and used in the polymerization of 4-methyl-1-pentene it was noted that the productivity in terms of poly-methyl-1-pentene varied in an unexpected manner.

The present invention is based upon the discovery of the conditions necessary to obtain consistent productivities of poly-methyl-1-pentene using catalysts of that type.

Another object of the present invention is to provide a method for increasing the activity of a catalyst for the polymerization of 4-methyl-1-pentene.

Other aspects, objects, and advantages of the present invention will be apparent from the following disclosure.

SUMMARY OF THE INVENTION

In accordance with the present invention, there is provided a process for the preparation of a catalyst suitable for the polymerization of α-olefins. The process involves (a) forming a first component by reacting reactants comprising a magnesium dihalide, a phenol, an alkyl benzoate, and a titanium tetrahydrocarbyloxide; (b) reacting said first component with an organoaluminum halide comprising ethylaluminum sesquichloride to produce a solid product; and (c) then contacting the resulting solid product with an activating liquid comprising titanium tetrachloride and trichlorosilane in a confined zone under a pressure of at least about 70 psi.

In another aspect, the present invention provides for the catalyst produced by such a process and the use of such a catalyst in the polymerization of α-olefins and particularly in the polymerization of 4-methyl-1-pentene.

DETAILED DESCRIPTION OF THE INVENTION

In regard to the magnesium dihalide, generally any suitable magnesium dihalide can be employed. While one can employ a wide range of magnesium chlorides, including those materials which are sold commercially as "anhydrous" magnesium dichloride, which generally have no more than about one mole of water per mole of magnesium dichloride, it has been found that generally somewhat better results are obtained if the magnesium dichloride has slightly more than 1 mole of water per mole of magnesium chloride. In an especially preferred embodiment, the first component is prepared using magnesium chloride that contains 0.5 to 1.5 moles of water per mole of magnesium chloride while being substantially free of organic compounds. The effect of these small amounts of water on the catalyst are disclosed in Canadian Patent No. 1,225,080, the disclosure of which is incorporated herein by reference. Another preferred embodiment employs magnesium chloride that contains less than 0.5 moles of water per mole of magnesium chloride and further contains about 0.2 to about 1.5 moles of alcohol per mole of magnesium chloride. The effect of such small amounts of alcohol are disclosed in Canadian Patent No. 1,213,267, the disclosure of which is incorporated herein by reference.

Examples of compounds falling within the scope of titanium tetrahydrocarbyloxides include those compounds having the general formula $Ti(OR)_4$ wherein each R is individually selected from an alkyl, cycloalkyl, aryl, alkaryl, and aralkyl hydrocarbon radical containing from about 1 to about 20 carbon atoms per radical, wherein each R can be the same or different. Examples of such titanium hydrocarbyloxides include, for example, titanium tetramethoxide, titanium dimethoxydiethoxide, titanium tetraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetra-p-tolyloxide, and titanium tetraphenoxide. It is currently preferred to employ a titanium tetrabutoxide.

In preparing the catalyst of this invention a phenol is also employed in preparing the first catalyst component. The term "phenol" is used herein to refer to substituted as well as unsubstituted phenolic compounds. Typical examples include phenol, o-methylphenol, m-methylphenol, p-methylphenol, 4-phenylphenol, o-fluorophenol, m-fluorophenol, p-fluorophenol, p-sec-butylphenol, p-ethylphenol p-methoxyphenol, and the like. The preferred phenols have 6 to 12 carbon atoms per molecule.

Further an alkylbenzoate is also used in making the first component of the catalyst. Some examples of typical alkylbenzoates include ethylbenzoate, ethyl-t-methoxybenzoate, ethyltoluate, ethyl-p-butoxybenzoate and butylbenzoate. The preferred alkylbenzoates are those having 8 to 12 carbon atoms per molecule.

The molar ratio of the titanium tetrahydrocarbyloxide to the magnesium dihalide can be selected over a relatively broad range. Generally, the molar ratio is within the range of about 10:1 to about 1:10; however, the most common molar ratios are within the range of about 2:1 to about 1:2. Currently a molar ratio of titanium to magnesium of about 1:2 is preferred.

The total number of moles of phenol and alkylbenzoate employed can affect to some extent the activity and/or selectivity of the resulting catalyst. Typically, the ratio of the sum of the moles of those two electron donors to the moles of the titanium compound are in the range of about 5:1 to about 1:1, more preferably about 3:1, to about 2:1. Most preferably about one half mole of ethylbenzoate is employed per mole of titanium compound.

The first component is normally prepared by mixing together the four named types of reactants by heating, e.g. refluxing, in a suitable dry (essential absence of water) solvent or diluent, which is essentially inert to these components and to the product produced. By the term inert is meant that the liquid does not chemically react with the dissolved components in such a manner as to interfere with the formation of the desired product or the stability of the product once it is formed. Some examples of solvents and diluent include, for example, n-pentane, n-heptane, methylcylcohexane, toluene, xylenes, and the like. Currently aromatic solvents are preferred such as, for example xylene, because the solubility of the metal halide compound and the transition metal compound appears to be higher in aromatic solvents as compared to aliphatic solvents, particularly at low temperatures.

The four above-mentioned types of reactants are generally mixed at a temperature in the range of from about 0° C. to about 50° C. or higher. A typical first step in the catalyst preparation would involve adding magnesium dichloride to xylene adding sufficient water to bring the water content within the preferred range, heating to a temperature of about 40° to 50° cooling to about 30° C., and then adding the phenol and the titanium compound. Subsequently, the mixture would be heated to a temperature in the range of about 90° to 100° C. and stirred. Then the alkylbenzoate would be added and the mixture stirred while at the elevated temperature of about 90° to about 100° C. to obtain a solution. Following the heating operation, the resulting solution can be filtered if desired to remove any undissolved material or extraneous solids before being contacted with the organoaluminum halide in the next step of the of the catalyst preparation.

In preparing this preferred catalyst the organoaluminum halide that is used as a precipitating agent comprises ethylaluminum sesquichloride. The ethylaluminum sesquichloride can be added directly to the solution resulting from step (a) or it can be added in the form of a hydrocarbon solution of the halide. Under some circumstances it is desirable to add some hexane. This has been found to provide additional precipitate.

As taught in the aforementioned patents, the temperature employed for reacting the organoaluminum precipitating agent and the product of the first step of the catalyst preparation can be selected over a broad range. Generally the temperature employed is within the range of about 0° C. to about 50° C. or higher, while temperatures within the range of about 20° C. to about 30° C. would most often be employed. Since heat is involved when the ethylaluminum sesquichloride and the solution are mixed, the mixing rate is adjusted as required and additional cooling is employed if necessary to maintain a relatively constant mixing temperature. After completing the mixing, the resulting slurry is generally stirred or agitated for sufficient time, generally within the range of about 15 minutes to about 5 hours to ensure that mixing of the components is complete. Thereafter, stirring is discontinued and the resulting solid product is recovered by filtration, decantation, or the like. The solid product is then washed with a suitable liquid such as for example a hydrocarbon such as n-pentane, n-hexane, n-heptane, cyclohexane, benzene, or xylene to remove soluble materials which may be present. The resulting solid product is generally then dried and stored under nitrogen until subjected to the activation treatment.

The molar ratio of the transition metal compound of the first catalyst component to the organoaluminum precipitating agent can be selected over a relatively broad range. Generally, the molar ratio of the transition metal of the first catalyst component to the second catalyst component is within the range of from about 10:1 to about 1:10 and more generally within the range of about 2:1 to about 1:3.

The activating liquid that is employed in this particular invention comprises titanium tetrachloride and trichlorosilane. The ratio of the titanium tetrachloride to the trichlorosilane can vary over a wide range, however, in terms of weight a greater amount of titanium chloride is generally used than of the trichlorosilane. In a currently most preferred embodiment, the activating liquid is a mixture of titanium tetrachloride, trichlorosilane and silicon tetrachloride. Here again the relative amounts of the various components of the activating solution can vary, however, it is generally preferred that the trichlorosilane be employed in a greater weight basis than the silicon tetrachloride and that titanium tetrachloride be employed in a greater weight basis than the trichlorosilane. Typical values for the weight ratio of the titanium tetrachloride:trichlorosilane:silicon tetrachloride would be in the range of about 4:2:1 to about 5:3:1, or more preferably about 4.5:2.5:1.

The reaction of the solid product from step (d) with the activating liquid can be carried out solely in the mixture of the halogen-containing compounds or in a liquid medium in which the halogen-containing compounds are soluble.

The temperature employed in the activation step can be selected over a relatively broad range. However, for practical purposes it would generally be carried out in the range of about 0° C. to about 150° C., more preferably 20° C. to a temperature somewhat less than 120° C., still more preferably about 30° C. to about 100° C. By using higher pressures it is possible to obtain highly active catalyst at normal ambient temperature, i.e. about 30° C. to about 50° C.

The activation is carried out in a confined zone so that the pressure can be maintained above a selected value. The present invention is based upon the discovery that when the catalyst is used in the polymerization of 4-methyl-1-pentane the pressure of the activation step can affect the productivity of the catalyst. As a general rule the contacting of the solid product of step (b) with the activating liquid would be conducted at a pressure of at least about 70 psi. The activity generally increases from about 40 to about 70 psi and above 70 psi is fairly constant. A particularly convenient pressure range would be in the range of about 70 to about 95 psi, or more preferably about 85 to about 95 psi.

If desired, the pressure within the confined zone can be raised by the introduction of a non-deleterious material. Particularly preferred materials would include normally inert gases such as nitrogen or argon. Hydrogen chloride gas can also be used to raise the pressure.

The catalyst preparation of the present invention can also take advantage of the benefits of multiple activation as taught in U.S. Pat. No. 4,588,703, the disclosure of which is incorporated herein by reference. If sequential activation, i.e. multiple use of fresh batches of the same activating liquid, is employed one needs to ensure that that pressure within the confined zone of in the second activating treatment is at least about 70 psi, more preferably at least about 85 psi, in order to obtain maximum activation.

In some cases it may be desirable to employ a catalyst which contains prepolymer which is formed on the catalyst prior to the activation treatment. By using the present invention which requires an elevated pressure during the activation step, it is possible to use lower temperatures during the activation, for example, a temperature as low as about 30° C. This is particularly desirable in cases where the prepolymer might be adversely effected by higher temperatures.

Typically as has been taught in previous patents, such as U.S. Pat. No. 4,588,703, the prepolymer is formed by reacting a small amount of polymerizable monomer with the catalyst, generally while employing a cocatalyst. Typical monomers used in the prepolymerization include aliphatic mono-1-olefins, preferably those containing 2 to 10 carbon atoms per molecule, and conjugated diolefins containing 4 to 8 carbon atoms per molecule. The cocatalyst is generally selected from any of the cocatalysts that will be mentioned later for use with the inventive catalyst.

The weight percent prepolymer deposited on the catalyst based on the total weight of the prepolymerized catalyst is typically from about 1 to about 90 weight percent, more commonly about 1 to about 50 weight percent, and more preferably about 5 to about 10 weight percent. More details regarding the formation of catalyst having prepolymer is provided in U.S. Pat. No. 4,325,837, the disclosure of which is incorporated herein by reference.

The amount of activating liquid employed can vary widely depending upon the results desired. In terms of productivity in the polymerization of 4-methyl-1-pentene, at levels of 8.5 lbs of activating liquid per pound of catalyst and above, the activity is fairly constant. If the level is less than about 8.5 pounds/pound, the activity of the catalyst is generally proportionally lower. Generally at higher pressures a given amount of activating liquid is more effective. Thus if less than 8.5 pounds/pound is used, a higher activation pressure, i.e. 85 psi or higher should be used.

The time for each activation step can vary over a wide range and is generally within the range of about 10 minutes to about 10 hours. The time needed to obtain the maximum amount of activation with a particular amount of activating liquid can readily be determined by routine experimentation.

The catalyst of the present invention can be used in the polymerization of olefins. Olefins which can be homopolymerized or copolymerized using the inventive catalyst include aliphatic mono-1-olefins. While the invention would appear to be suitable for use in the polymerization of any aliphatic mono-1-olefin, those olefins having 2 to 18 carbon atoms are generally the olefins which are polymerized. The mono-1-olefins can be polymerized according to the present invention employing either a particle form process, a gas phase process, or a solution phase process. Aliphatic mono-1-olefins can be copolymerized with other 1-olefins and/or with small amounts of other ethelinically unsaturated monomers, such as, 1,3-butadiene, isoprene, 1,3-pentadiene, styrene, α-methylstyrene, and similar ethylenically unsaturated monomers which do not impare the catalyst. As is apparent from the foregoing disclosure, the present catalyst is particularly useful for the polymerization of 4-methyl-1-pentene.

It is considered that the catalyst of this invention can also be utilized in the preparation of homopolymers and/or copolymers of conjugated diolefins. Generally, the conjugated diolefins contain 4 to 8 carbon atoms per molecule. Examples of suitable conjugated diolefins include 1,3-butadiene, isoprene, 2-methyl-1-3-butadiene, 1,3-pentadiene and 1,3-octadiene. Suitable comonomers, besides the conjugated diolefins listed above include mono-1-olefins previously described and vinyl aromatic compounds in general. Some suitable vinyl aromatic compounds are those having from about 8 to about 14 carbon atoms per molecule, and include for example styrene and various alkyl styrenes, such as 4-ethylstyrene and such as 1-vinylnapthalene.

While it may not be necessary in all instances to employ a cocatalyst with the catalyst of the present invention, the use of cocatalyst is recommended for best results. The organometallic cocatalyst suitable for use in accordance with the present invention can be selected from among the hydrides and organometallic cocatalyst suitable for use in accordance with the present invention can be selected from among the hydrides and organometallic compounds of metals of Groups IA, II, and IIIA of the Periodic Table. Of the organometallic cocatalysts, organoaluminum compounds are preferred, with the most preferred organoaluminum cocatalyst being compounds of the formula $R_3Al$ which include, for example, trimethylaluminum, triethylaluminum triisopropylaluminum, tridecylaluminum, trieicosylaluminum, tricyclohexylaluminum, triphenylaluminum, 2-methylpentyldiethylaluminum, and triisoprenylaluminum.

Generally the molar ratio of the organometallic compound of the cocatalyst to the transition metal of the first catalyst component is not particularly critical and can be selected over a relatively broad range. Generally, the molar ratio of the organometallic compound of the cocatalyst to the transition metal of the first catalyst component is within a range of about 1:1 to about 1500:1. For catalyst systems wherein the cocatalyst comprises at least one organoaluminum compound, typically there is employed about 0.25 to about 15 milligrams of the titanium-containing catalyst per millimole of organoaluminum cocatalyst.

In some cases it may be desirable to use a multi-component cocatalyst system comprising triethylaluminum and either aromatic esters such as ethylanisate, ethylbenzoate, methyl-p-toluate, etc.; or silanes such as diphenyl dimethoxysilane, triphenyl ethoxysilane, methyl triethoxysilane, etc.

In general the catalyst of this invention can be used with the same types of cocatalyst systems and in the same manner as disclosed in the aforementioned U.S. Pat. Nos. 4,588,703; 4,394,291; and 4,477,588.

The olefin polymers made with the catalyst of this invention are useful in preparing articles by conventional polyolefin processing techniques such as injection molding, rotational molding, extrusion of film, and the like. A still further understanding of the present invention and its objects and advantages will be provided by the following examples:

EXAMPLE I

CATALYST PREPARATION

In order to minimize the effects of variation in the process, large batches of catalyst were prepared through the precipitation step in the 100 gallon Pfaudler reactors. These large batches were split into smaller lots and stored in 5 gallon Carboys. These smaller lots were then activated individually under varying conditions to be described below. In this manner, a series of batches could be compared directly with confidence that changes in catalyst activity were due to changes in the activation technique and not to variation earlier in the process.

A typical large batch of the catalyst was prepared as follows: about 36 gallons of xylene was added to the reaction vessel. Then 5610 grams of $MgCl_2$ hydrate was added to the xylene. After that 1324 ml of water was added over a period of about 30 minutes. The mixture was then heated to a temperature in the range of 40° to 50° C. and stirred at that temperature for about 80 minutes. After that the mixture was allowed to cool to about 30° C. and then 7560 grams of 4-phenylphenol was added followed by the addition of 23 pounds of butyl titanate. The mixture
was then heated to 90° -100° C. and stirred. After about 15 minutes of stirring 4.8 pounds of ethylbenzoate was added. The resulting mixture was maintained at a temperature in the range of 90° to 100° C. for about 45 minutes after the addition of the ethyl benzoate and then was cooled to about 50° C. Then nitrogen dispersion was provided by passing nitrogen through the slurry. Then 0.63 pounds of ethyl aluminum sesquichloride was added gradually over a period of 1 hour and 3 minutes. The nitrogen was then turned off and the slurry stirred for 30 minutes. Then 15 gallons of hexane was added to the slurry. The liquid was decanted and then the solid was subjected to four washings, each using 45 gallons of hexane. The wash step involved contacting the solid with the hexane and then decanting the hexane. The large batch was then divided and stored in 5 gallon Carboys for later use.

EXAMPLE II

CATALYST ACTIVATION

A series of runs were carried out using several lots of the same catalyst batch. The activating fluid was a mixture of $TiCl_4$, $SiCl_4$, and $HSiCl_3$. In some of the runs the catalyst was contacted only once with the activating fluid. In other runs multiple contactings were employed.

In the single activation runs a 10 gallon reactor was purged twice with $N_2$ and then catalyst slurry was transferred to the reactor and mixed for about 10 minutes. Then the activation fluid was added and the pressure raised to the desired level by the addition of nitrogen. The mixture was then heated to about 100° C. and held at temperature for about 1 hour. Then the mixture was cooled down to about 30° C., allowed to settle, and then the liquid decanted. Then the catalyst was washed four times with 5 gallons hexane with the liquid being decanted after each wash.

In the multiple activation runs the amount of activating fluid used in each was only half that used in the single activation. The catalyst resulting from the first activation was washed with 5 gallons of hexane, then resulting liquid was decanted, and then a fresh batch of 20 pounds of activation fluid was added to the reactor. As before the reactor was pressurized, heated to about 100° C. and held at that temperature for about 60 minutes. Then the mixture was cooled to about 30° C. and the liquid decanted. The resulting catalyst was then washed 4 times in the same manner as those prepared using only a single activation step.

The catalysts produced by those various techniques were employed in the polymerization of 4-methyl-1-pentene under identical conditions. The polymerizations were carried out in a one gallon stirred stainless steel autoclave. The amounts of catalyst and monomer added to the reactor initially were measured. After the catalyst and 4-methyl-1-pentene was added then about 8.4 ml of triethyl aluminum was added. The reactor was then sealed and the desired amount of hydrogen was added. Approximately 25 psi of nitrogen was added. The reactor was then brought to about 50° C. and maintained for about 1 hr. After 1 hour the reactor was cooled both by venting and using cooling water. The liquid remaining was then removed, poured into a tared pan, and placed in a fume hood. After drying in the pan overnight in a vacuum oven at about 70° C., the weight of the polymer was determined.

A comparison of the results is shown in Table I. Productivity, as used herein, refers to the grams of polymethylpentene per gram of solid catalyst produced per hour.

TABLE I

| | Activating Vs. Pressure for Activation | | |
|---|---|---|---|
| Run | Pressure 1 (psi) | Pressure 2 (psi) | Productivity (g/g/hr) |
| 1 | 50 | no second charge | 7972 |
| 2 | 85 | no second charge | 8549 |
| 3 | 85 | 45 | 9569 |
| 4 | 80 | 86 | 14315 |

The interaction between reactor pressure and the amount of activation fluid is readily apparent from the series of activations summarized in Table I. The size of activation fluid charge and temperature were the same for all experiments. Also, all activations were done on the same lot of precipitated catalyst. When one charge was made and the pressure was limited to 50 psi, the activity was only 7972 g/g/hr of poly-4-methyl-1-pentene. Increasing the pressure to 85 psi increased the activity to 8549 g/g/hr. Adding the second charge of activation fluid without additional reactor pressure only increased the activity to 9569 g/g/hr. Adding the second charge with additional nitrogen pressure increased the activity to 14,315 g/g/hr. The only difference between these catalysts was the number of activation fluid charges and the pressure of the reactor. Without sufficient pressure, the activation fluid is much less effective.

EXAMPLE III

In another set of experiments catalyst was prepared using steps (a) and (b) and then about 50 weight percent polyolefin prepolymer was deposited thereon prior to contacting the solid with the activating liquid. Then different activation temperatures were employed. The polymerizations were carried out using the same conditions as described in Example II. The effect of the temperature is shown in Table II. The activation pressure was maintained at a level of at least about 85 psi of $N_2$.

TABLE II

| Low Temperature Activation of Prepolymer Treated Catalysts | | |
|---|---|---|
| Run | Temperature (C.) | Productivity (based on contained catalyst) |
| 5 | 50 | 11,200 |
| 6 | 30 | 11,600 |

These results show that reasonable activation can be obtained at temperatures as low as 30° C. to 50° C. This is particularly important because it has been observed that if a prepolymerized catalyst is heated at 80° C. for times as short as 20 minutes, the heating has an adverse effect on the effectiveness of the prepolymer in controlling polymer particle size when the prepolymerized catalyst is used in polymerization.

While the present invention has now been described in general terms and specific examples have been provided to illustrate advantages of the invention, it should be clear that various modifications and variations can be made without departing from the scope and spirit of the invention.

That which is claimed is:

1. A process for the preparation of a catalyst suitable for the polymerization of an α-olefin, said process comprising
   (a) forming a first component by reacting reactants comprising a magnesium dihalide, a phenol, an alkylbenzoate, and a titanium tetrahydrocarbyloxide;
   (b) reacting said first component with an organoaluminum halide comprising ethylaluminum sesquichloride to produce a solid product; and
   (c) then contacting the resulting solid product with an activating liquid comprising titanium tetrachloride and trichlorosilane in a confined zone under pressure of at least about 70 psi.

2. A process according to claim 1 wherein step (c) is conducted at a temperature in the range of at least about 30° C. and less than about 120° C.

3. A process according to claim 2 wherein step (c) is conducted at a temperature of at least about 100° C.

4. A process according to claim 3 wherein step (c) is conducted at a temperature of about 100° C.

5. A process according to claim 1 wherein the solid resulting from step (b) is reacted with an olefin monomer to form about 1 to about 50 weight percent prepolymer thereon prior to being contacted with said activating liquid in step (b).

6. A process according to claim 5 wherein step (c) is conducted at a temperature in the range of about 30° C. to about 50° C.

7. A process according to claim 2 wherein step (c) is conducted at a temperature in the range of about 85° C. to about 100° C.

8. A process according to claim 7 wherein said activating liquid further comprises silicon tetrachloride.

9. A process according to claim 8 wherein the weight of titanium tetrachloride in said activating liquid exceeds that of the trichlorosilane and the weight of the trichlorosilane exceeds that of the silicon tetrachloride.

10. A process according to claim 9 wherein the weight ratio of the $TiCl_4:HSiCl_3:SiCl_4$ is in the range of about 4:2:1 to about 5:3:1.

11. A process according to claim 10 wherein the weight ratio of the titanium tetrachloride:$HSiCl_3$:$SiCl_4$ is about 4.5:2.5:1.

12. A process according to claim 11 wherein said catalyst is prepared by reacting magnesium dichloride hydrate, 4-phenyl-phenol, ethylbenzoate, and titanium tetra-n-butoxide.

13. A process according to claim 12 wherein the weight ratio of said activating liquid to the solid in step (c) is at least about 8.5:1.

14. A process according to claim 12 wherein after step (c) has been completed the solid is (d) washed with a hydrocarbon and then (e) contacted again with the same activating liquid in a confined zone under conditions sufficient to further improve the activity of the catalyst.

15. A process according to claim 14 wherein step (e) is conducted at a pressure of at least about 70 psig.

16. A process according to claim 15 wherein step (c) and step (e) are conducted at a pressure in the range of about 70 to about 90 psi.

17. A process according to claim 16 wherein a non-deleterious gas is added during at least one of steps (c) and (e) to raise the pressure to the desired level.

18. A process according to claim 17 wherein said gas is selected from nitrogen, argon, and hydrogen chloride.

19. A catalyst produced by the process of claim 1.

* * * * *